(12) United States Patent
Fu et al.

(10) Patent No.: US 12,498,267 B2
(45) Date of Patent: Dec. 16, 2025

(54) MICROSCOPIC CONFOCAL FLUORESCENCE SPECTROMETER

(71) Applicant: Shanxi University, Shanxi (CN)

(72) Inventors: Yongming Fu, Taiyuan (CN); Miao Yue, Taiyuan (CN); Jie Ma, Taiyuan (CN); Zeqian Ren, Taiyuan (CN); Peng Chen, Taiyuan (CN)

(73) Assignee: Shanxi University, Taiyuan (CN)

( * ) Notice: Subject to any disclaimer, the term of this patent is extended or adjusted under 35 U.S.C. 154(b) by 219 days.

(21) Appl. No.: 18/418,402

(22) Filed: Jan. 22, 2024

(65) Prior Publication Data

US 2025/0146868 A1    May 8, 2025

(30) Foreign Application Priority Data

Nov. 6, 2023 (CN) .......................... 202311467017.3

(51) Int. Cl.
| | |
|---|---|
| *G01J 3/02* | (2006.01) |
| *G01J 3/12* | (2006.01) |
| *G01J 3/44* | (2006.01) |
| *G02B 21/00* | (2006.01) |

(52) U.S. Cl.
CPC .......... *G01J 3/0291* (2013.01); *G01J 3/0208* (2013.01); *G01J 3/0213* (2013.01); *G01J 3/0224* (2013.01); *G01J 3/0237* (2013.01); *G01J 3/12* (2013.01); *G01J 3/4406* (2013.01); *G02B 21/0028* (2013.01); *G02B 21/0076* (2013.01); *G01J 2003/1213* (2013.01)

(58) Field of Classification Search
CPC ...... G01J 3/0291; G01J 3/0208; G01J 3/0213; G01J 3/0224; G01J 3/0237; G01J 3/12; G01J 3/4406; G01J 2003/1213; G02B 21/0028; G02B 21/0076; G02B 21/0032; G01N 21/6458
See application file for complete search history.

(56) References Cited

U.S. PATENT DOCUMENTS 6,657,216 B1 * 12/2003 Poris .................. G01B 11/0608
  250/559.22
6,667,830 B1 * 12/2003 Iketaki ............... G02B 21/0072
  359/368

(Continued)

*Primary Examiner* — Tarifur R Chowdhury
*Assistant Examiner* — Kemaya Nguyen
(74) *Attorney, Agent, or Firm* — Dobrusin Law Firm, P.C.

(57) ABSTRACT

A microscopic confocal fluorescence spectrometer is provided. The microscopic confocal fluorescence spectrometer includes an optical system and an instrument body. By adopting an open microscopic fluorescence light path, a lens body part of an existing spectrometer microscope is omitted, so that the space behind an objective lens is significantly increased. By reasonably arranging a laser, a spectrum detection device and other components, the space on the side of the objective lens is further increased, and the occupied space of the optical system is reduced, so that the overall volume of the instrument is reduced, and the adaptability of the instrument is further improved. In addition, the spectrum detection device is arranged outside the second shell to facilitate the heat dissipation of the spectrum detection device, so that the heat stability and working reliability of the instrument are further improved.

18 Claims, 5 Drawing Sheets

(56) References Cited

U.S. PATENT DOCUMENTS

| | | | |
|---|---|---|---|
| 7,705,987 B2* | 4/2010 | Maiti | G01N 21/6458 |
| | | | 356/417 |
| 2001/0019410 A1* | 9/2001 | Kojima | G01J 3/28 |
| | | | 356/334 |
| 2004/0146913 A1* | 7/2004 | Hirano | G01N 21/6428 |
| | | | 435/6.12 |
| 2004/0225222 A1* | 11/2004 | Zeng | G01J 3/32 |
| | | | 600/476 |
| 2012/0169863 A1* | 7/2012 | Bachelet | G01N 21/5907 |
| | | | 348/79 |
| 2017/0343825 A1* | 11/2017 | Sinha | G01J 3/02 |
| 2018/0067053 A1* | 3/2018 | Aizawa | G02B 21/0036 |
| 2022/0118549 A1* | 4/2022 | Yu | B23K 26/067 |
| 2023/0077503 A1* | 3/2023 | Gaudreau | H04B 10/2525 |
| | | | 398/152 |

* cited by examiner

MICROSCOPIC CONFOCAL FLUORESCENCE SPECTROMETER

CROSS-REFERENCE TO RELATED APPLICATION

This patent application claims the benefit and priority of Chinese Patent Application No. 2023114670173 filed with the China National Intellectual Property Administration on Nov. 6, 2023, the disclosure of which is incorporated by reference herein in its entirety as part of the present application.

TECHNICAL FIELD

The present disclosure relates to the technical field of detecting instruments and their surrounding supporting facilities, in particular to a microscopic confocal fluorescence spectrometer.

BACKGROUND

Microscopic laser confocal fluorescence spectroscopy is a spectral analysis method to analyze the composition of substances and the characteristics and structures of molecules by analyzing the wavelength of fluorescence to know the composition of substances and the electronic and vibrational energy levels of excited molecules. The principle of the method is that an object is irradiated by short wavelength light to store energy, and then long wavelength light is slowly emitted. The emitted light is called fluorescence. If the energy-wavelength relationship diagram of fluorescence is drawn, this relationship diagram is the fluorescence spectrum.

Fluorescence is a photic luminescence phenomenon with slow luminescence. When a substance at room temperature is irradiated by incident light of a certain wavelength (usually ultraviolet rays or X-rays), the substance absorbs light energy and enters an excited state (usually with a different spin multiplicity from a ground state), and then slowly de-excites and emits emergent light of a wavelength (usually in visible light band) longer than that of the incident light. After the incident light is interrupted, the luminescence phenomenon is continued. The de-excitation process of emitting fluorescence is forbidden by the transition selection rules of quantum mechanics, so this process is very slow.

Microscopic laser confocal fluorescence spectrometer is an analytical instrument used in the fields of biology, chemistry, material science, pharmacy and chemical engineering. At present, microscopic fluorescence spectroscopy has become a conventional technical means for modern material structure analysis. However, microscopic fluorescence spectrometers in the prior art have high requirements for testing samples and testing operations and, their adaptability is poor.

SUMMARY

The purpose of the present disclosure is to provide a microscopic confocal fluorescence spectrometer so as to solve the problems in the prior art, so that the adaptability of the microscopic confocal fluorescence spectrometer is improved, and the working stability of the microscopic confocal fluorescence spectrometer is also enhanced.

In order to achieve the above purpose, the present disclosure provides the following solution. The present disclosure provides a microscopic confocal fluorescence spectrometer, including:

an optical system, the optical system includes a laser, a laser filter, a nanoparticle film linear polarizer, a laser attenuation device, an edge filter switching device, a dichroic mirror switching device, a beam splitter switching device, a video switching device, a confocal hole, a grating switching and rotating device, a spectrum detection device, a triaxial sample object stage and an objective lens; a light beam emitted by the laser is filtered by the laser filter and reflected, the reflected light beam is incident into the nanoparticle film linear polarizer, a light beam emitted from the nanoparticle film linear polarizer is attenuated by the laser attenuation device, the attenuated light beam is incident into an edge filter group of the edge filter switching device, the light beam reflected by the edge filter switching device passes through the dichroic mirror switching device, the beam splitter switching device and the video switching device in sequence, the light beam reflected by the video switching device irradiates on a measured substance through the objective lens, a fluorescence signal and scattered light produced by the measured substance after excitation are collected by the objective lens, reflected by the video switching device, and transmitted through the beam splitter switching device and the dichroic mirror switching device in sequence to reach the edge filter switching device; the scattered light is filtered by the edge filter switching device, the fluorescence signal is focused on the confocal hole and irradiates on a grating in the grating switching and rotating device for light splitting, and focused on the spectrum detection device to form a fluorescence spectrum; the triaxial sample object stage is capable of carrying the measured substance and driving the measured substance to move along a horizontal plane and a vertical plane, and the objective lens is arranged directly facing the triaxial sample object stage;

an instrument body, the instrument body includes an instrument base plate, and a first shell and a second shell which are arranged on the instrument base plate; the first shell and the second shell are arranged side by side, sum of base areas of the first shell and the second shell is smaller than top surface area of the instrument base plate, and the first shell includes a suspended structure; the laser, the laser filter, the nanoparticle film linear polarizer, the laser attenuation device, the edge filter switching device and the video switching device are all arranged in an inner cavity of the first shell, the objective lens is arranged at a bottom of the suspended structure of the first shell, and the triaxial sample object stage is arranged on the instrument base plate below the objective lens; the confocal hole and the grating switching and rotating device are arranged in an inner cavity of the second shell, the inner cavity of the second shell is a sealed light shielding cavity, and the spectrum detection device is arranged on an outer wall of the second shell.

Preferably, a first reflector, a second filter and a first filter are arranged in sequence between the laser filter and the nanoparticle film linear polarizing plate. A second reflector is arranged between the nanoparticle film linear polarizer and the laser attenuation device. A third reflector and a fourth reflector are arranged in sequence between the laser attenuation device and the edge filter switching device. A sixth reflector and a third lens are arranged in sequence between the edge filter switching device and the confocal hole. A fourth lens and a seventh reflector are arranged in sequence between the confocal hole and the grating switching and rotating device. A fifth lens is arranged between the grating switching and rotating device and the spectrum detection device. The video switching device includes a fifth reflector. The first reflector, the first filter, the second filter, the second reflector, the third reflector, the fourth reflector and the sixth reflector are all arranged in the inner cavity of the first shell. The third lens, the fourth lens and the seventh reflector are all arranged in the inner cavity of the second shell.

Preferably, a partition plate is arranged in the inner cavity of the second shell, and the fourth lens and the fifth lens are both arranged on the partition plate.

Preferably, an optical mounting plate is arranged in the inner cavity of the first shell, and the laser, the laser filter, the nanoparticle film linear polarizer, the laser attenuation device, the edge filter switching device and the video switching device are all arranged on the optical mounting plate.

Reinforcing plates are connected with the suspended structure of the first shell. The suspended structure is connected with a side wall of the first shell through the reinforcing plates. The reinforcing plates are each of a trapezoidal plate-shaped structure.

Preferably, the optical mounting plate is located at a middle-upper part of the inner cavity of the first shell. The number of the reinforcing plates is two, and the two reinforcing plates are arranged on both sides of the suspended structure.

Preferably, the spectrum detection device is fixed on an outer side wall of the second shell by a connecting piece, and the connecting piece is H-shaped.

Preferably, the triaxial sample object stage is detachably connected with the instrument base plate.

Preferably, the grating switching and rotating device includes the grating, a grating fixing part, a grating trimming element, a rotating element and a traverse module. The grating fixing part is configured to fix the grating. The grating trimming element is configured to adjust a pitching angle of the grating. The traverse module is configured to drive the grating fixing part to reciprocate along a direction perpendicular to light path. The rotating element is configured to drive the grating fixing part to rotate. The traverse module and the rotating element are each connected with a driver.

Preferably, the laser, the laser filter, the nanoparticle film linear polarizer, the laser attenuation device, the edge filter switching device and the video switching device each have an adjusting mechanism to realize adjustment of pitching angles of components and distances between the components.

Preferably, the first shell is of a split structure.

Legs are arranged at a bottom of the instrument base plate, and the legs are adjustable in height.

Compared with the prior art, the microscopic confocal fluorescence spectrometer in the present disclosure has the following technical effects.

The microscopic confocal fluorescence spectrometer in the present disclosure includes an optical system and an instrument body. By adopting an open microscopic fluorescence light path, a lens body part of an existing spectrometer microscope is omitted, so that the space behind an objective lens is significantly increased, and the adaptability of the instrument is improved. Moreover, by reasonably arranging a laser, a spectrum detection device and other components, the space on the side of the objective lens is further increased, the occupied space of the optical system is reduced, so that the overall volume of the instrument is reduced, and the adaptability of the instrument is further improved. The optical system is mounted by means of the instrument base plate, the first shell and the second shell, and strong support is provided for the components of the optical system, so that the working stability and reliability of the instrument are improved. The triaxial sample object stage is arranged on the instrument base plate on one side of the first shell and the second shell to facilitate the placement of the measured substance, so that the operation convenience of the instrument is improved. In addition, the spectrum detection device is arranged outside the second shell to facilitate the heat dissipation of the spectrum detection device, so that the thermal stability and working reliability of the instrument are further improved. In addition, the optical system and the instrument body in the present disclosure are of a modular structure design, and can work in conjunction with other detection equipment in practical applications, so that the universality of the instrument is improved.

BRIEF DESCRIPTION OF THE DRAWINGS

To more clearly illustrate the present embodiments of the present disclosure or the technical solution in the prior art, the following briefly introduces the attached figures to be used in the present embodiments. Apparently, the attached figures in the following description show merely some embodiments of the present disclosure, and those skilled in the art may still obtain other drawings from these attached figures without creative efforts.

Figure 1:
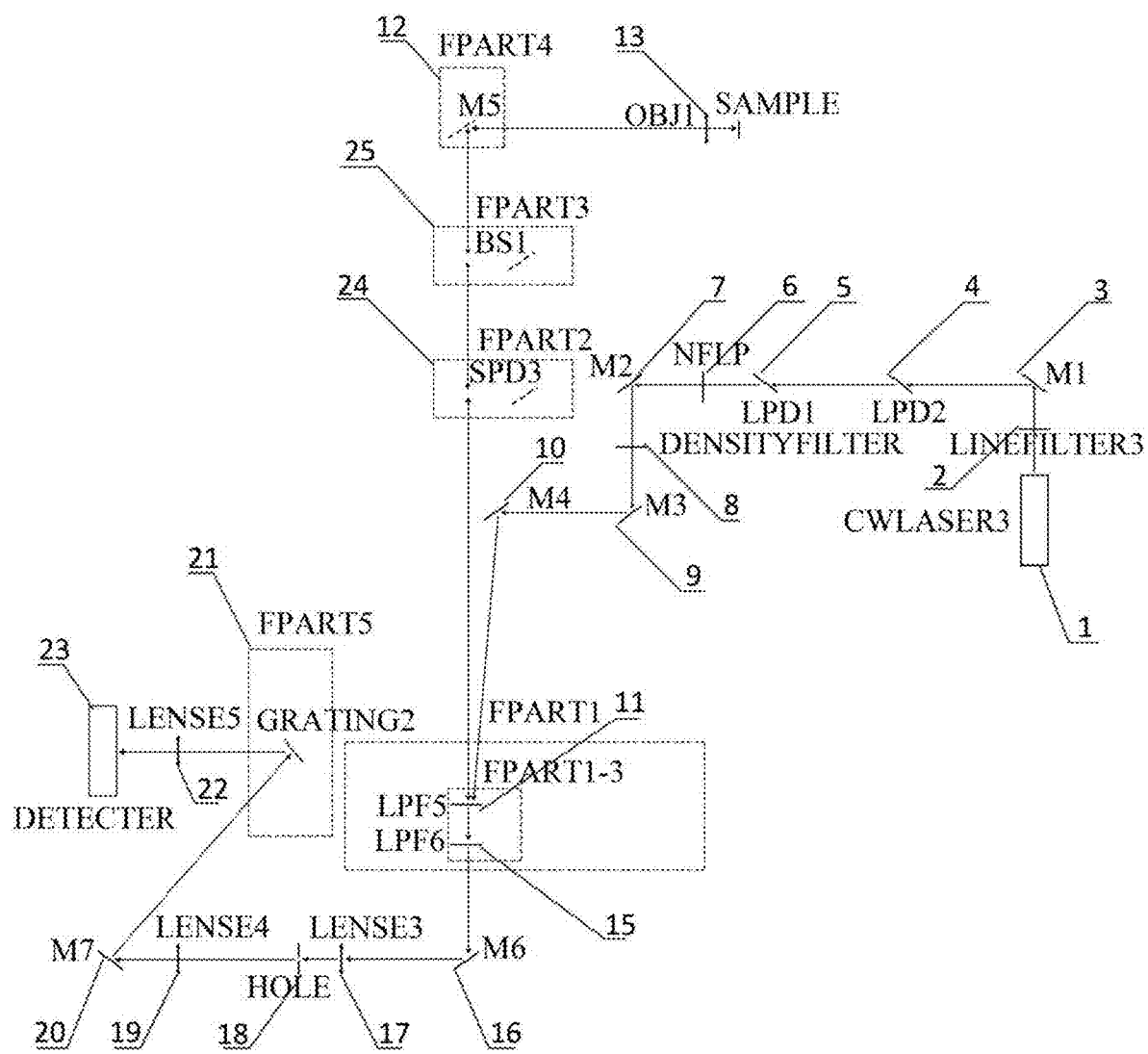
FIG. 1 is a schematic diagram of an excited light path of a microscopic confocal fluorescence spectrometer according to an embodiment of the present disclosure.
Figure 2:
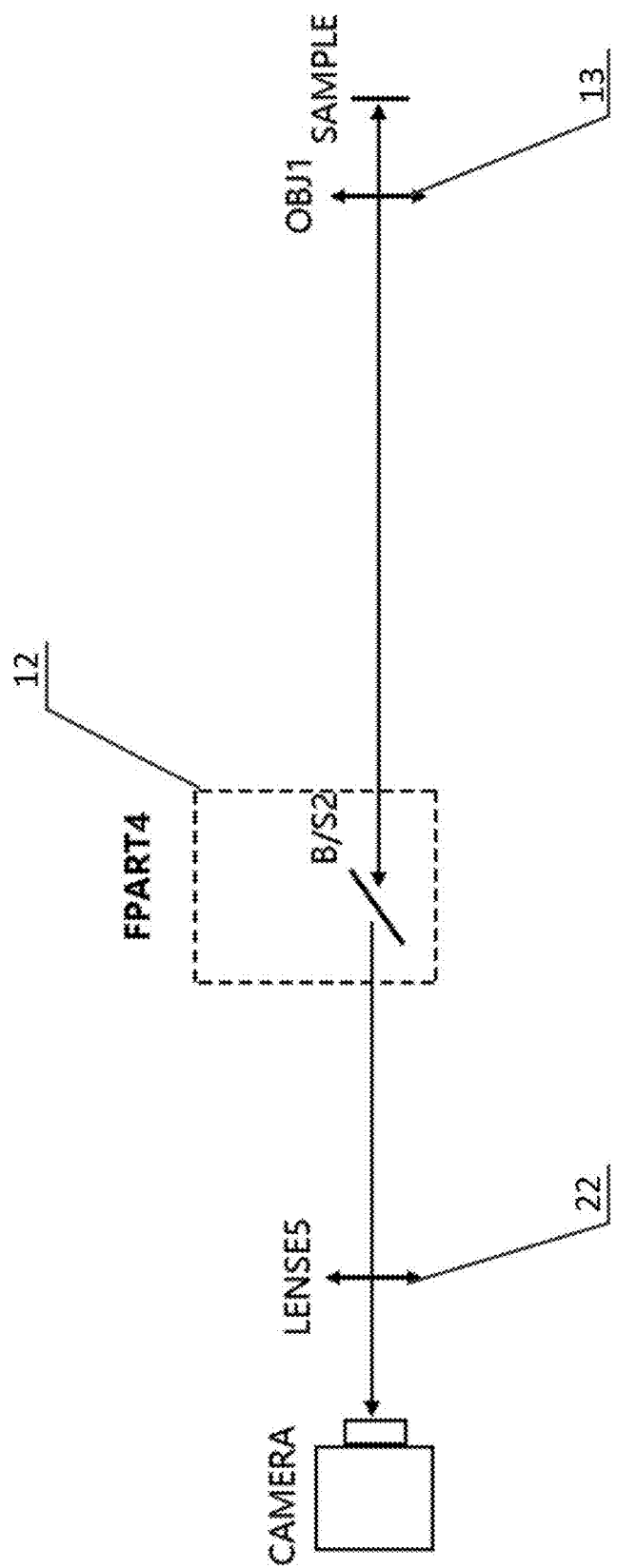
FIG. 2 is a schematic diagram of a microscope system light path of a microscopic confocal fluorescence spectrometer according to an embodiment of the present disclosure.
Figure 3:
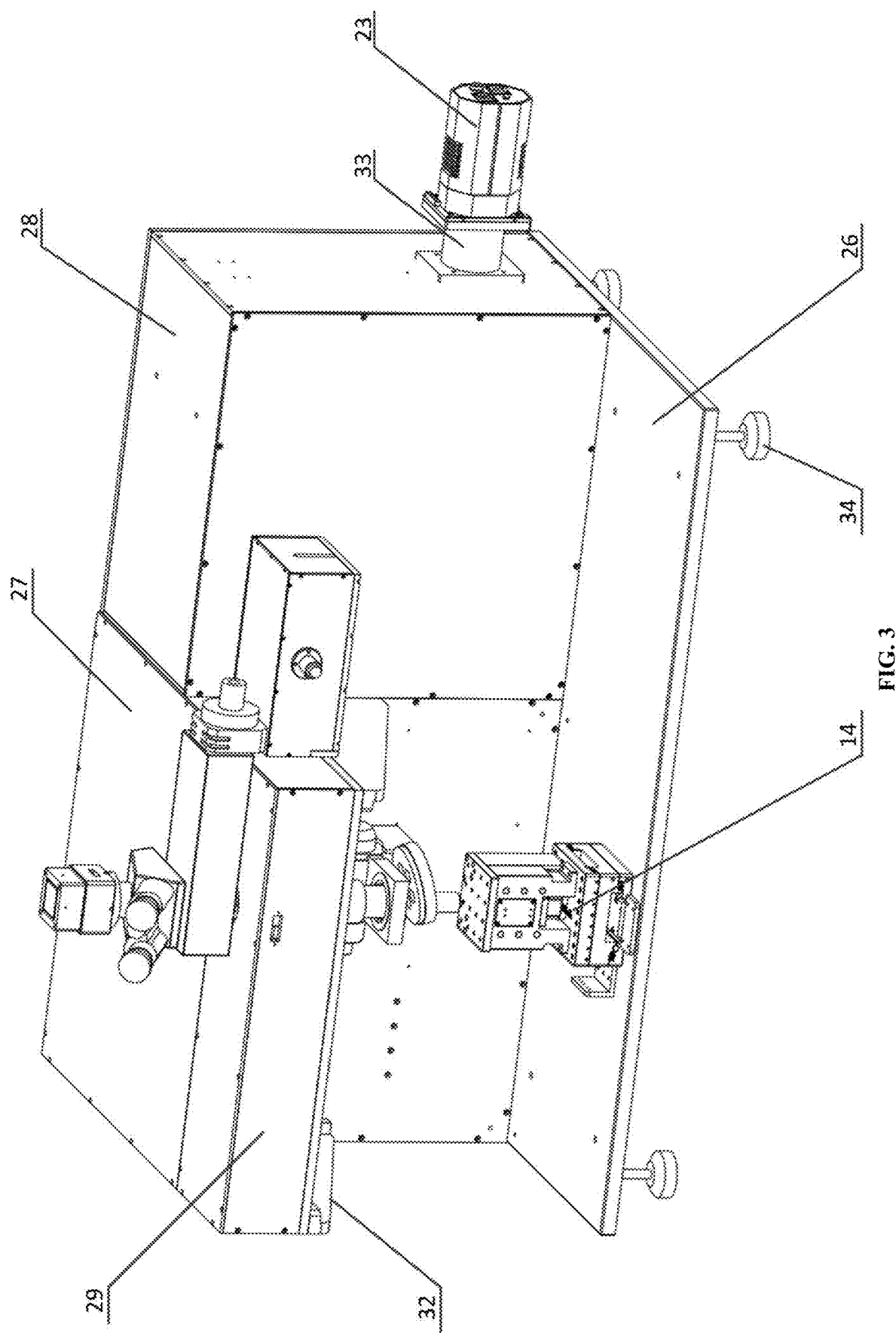
FIG. 3 is an axonometric schematic diagram of a microscopic confocal fluorescence spectrometer according to an embodiment of the present disclosure.
Figure 4:
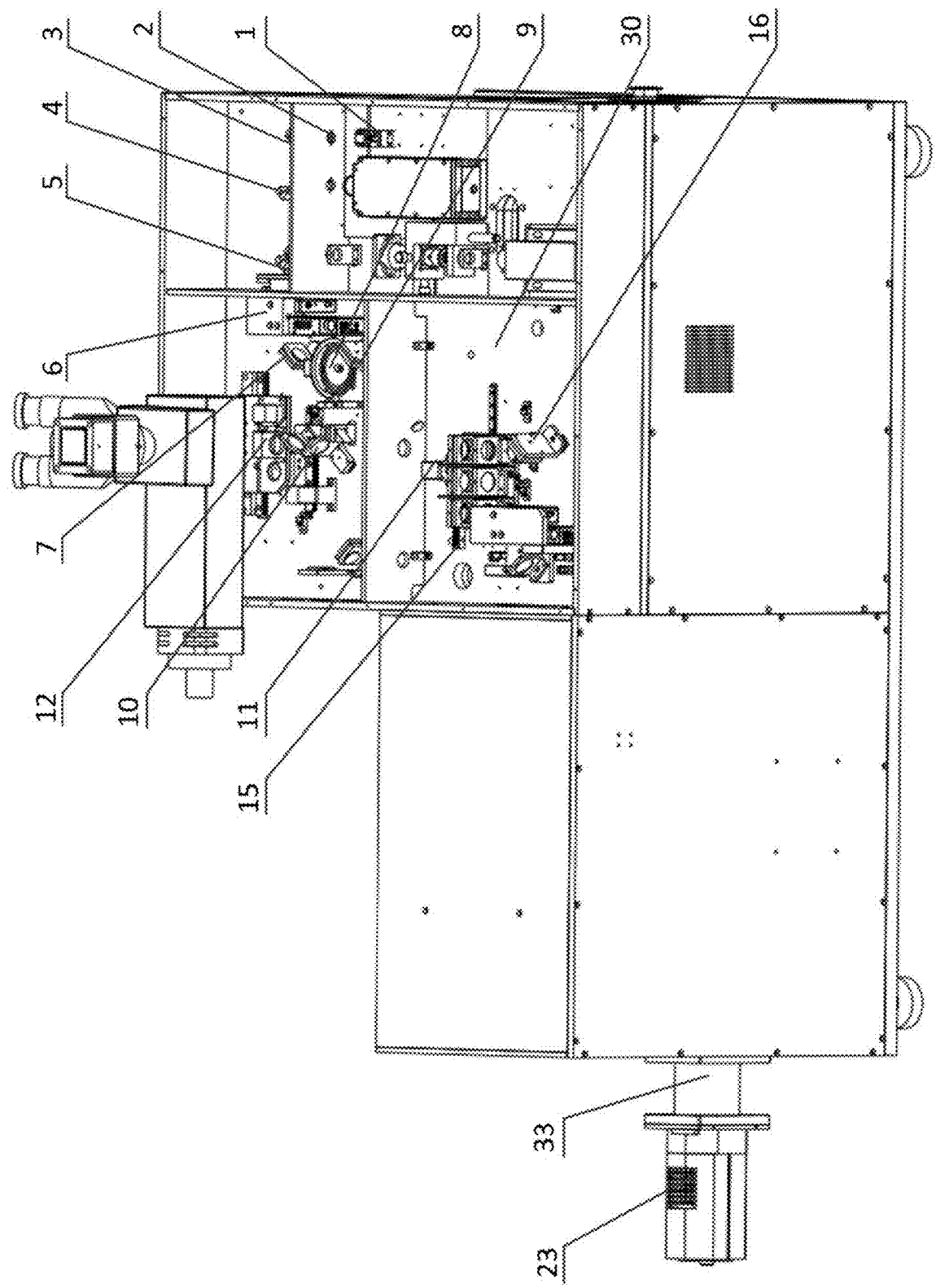
FIG. 4 is a partially structural schematic diagram of a microscopic confocal fluorescence spectrometer according to an embodiment of the present disclosure.
Figure 5:
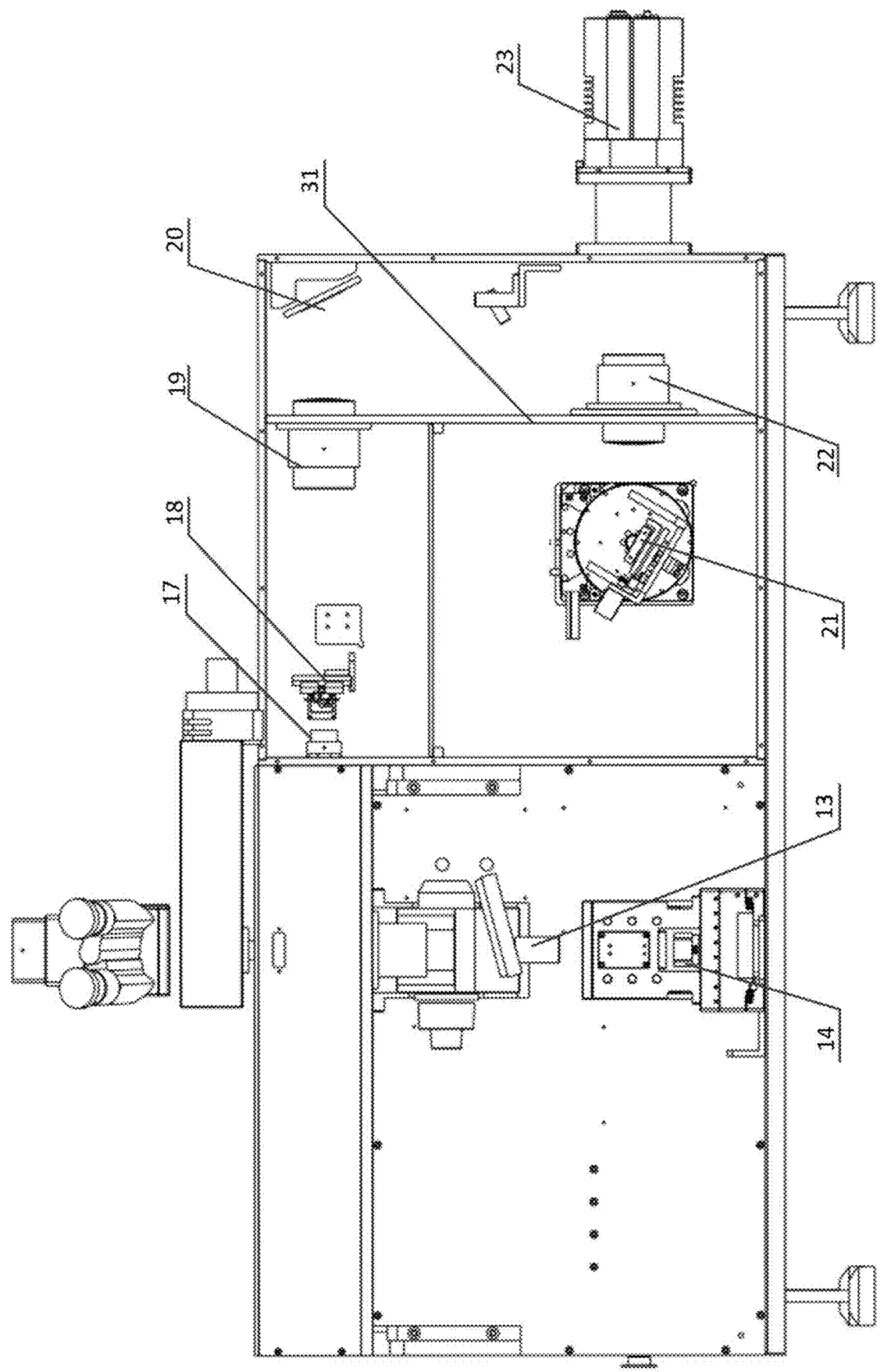
FIG. 5 is an internal structural schematic diagram of a microscopic confocal fluorescence spectrometer according to an embodiment of the present disclosure.

REFERENCE SIGNS 1 laser; 2 laser filter; 3 first reflector; 4 second filter; 5 first filter; 6 nanoparticle film linear polarizer; 7 second reflector; 8 laser attenuation device; 9 third reflector; 10 fourth reflector; 11 fifth filter; 12 video switching device; 13 objective lens; 14 triaxial sample object stage; 15 sixth filter; 16 sixth reflector; 17 third lens; 18 confocal hole; 19 fourth lens; 20 seventh reflector; 21 grating switching and rotating device; 22 fifth lens; 23 spectrum detection device; 24 dichroic mirror switching device; 25 beam splitter switching device; 26 instrument base plate; 27 first shell; 28 second shell; 29 suspended structure; 30 optical mounting plate; 31 partition plate; 32 reinforcing plate; 33 connecting piece; and 34 leg.

DETAILED DESCRIPTION OF THE EMBODIMENTS

The following clearly and completely describes the technical solutions in the embodiments of the present disclosure with reference to the attached figures of embodiments of the present disclosure. Apparently, the described embodiments are merely a part rather than all of the embodiments of the present disclosure. Based on the embodiments in the present disclosure, all other embodiments obtained by those skilled in the art without creative efforts fall within the scope protected by the present disclosure.

The purpose of the present disclosure is to provide a microscopic confocal fluorescence spectrometer so as to solve the problems in the prior art, so that the adaptability of the microscopic confocal fluorescence spectrometer is improved, and the working stability of the microscopic confocal fluorescence spectrometer is also enhanced.

To make the foregoing purpose, features and advantages of the present disclosure clearer and more comprehensible, the present disclosure is further described in detail below with reference to the attached figures and specific embodiments.

The present disclosure provides a microscopic confocal fluorescence spectrometer. The microscopic confocal fluorescence spectrometer includes an optical system and an instrument body. The optical system includes a laser 1, a laser filter 2, a nanoparticle film linear polarizer 6, a laser attenuation device 8, an edge filter switching device, a confocal hole 18, a grating switching and rotating device 21, a spectrum detection device 23, a triaxial sample object stage 14 and an objective lens 13. A light beam emitted by the laser 1 is filtered by the laser filter 2 and reflected, the reflected light beam is incident into the nanoparticle film linear polarizer 6. The light beam emitted from the nanoparticle film linear polarizer 6 is attenuated by the laser attenuation device 8. The attenuated light beam is incident into an edge filter group of the edge filter switching device. The light beam reflected by the edge filter switching device passes through a dichroic mirror switching device 24, a beam splitter switching device 25 and a video switching device 12 in sequence. The light beam reflected by the video switching device 12 irradiates on a measured substance through the objective lens 13. A fluorescence signal and Rayleigh scattered light produced by the measured substance after excitation are collected by the objective lens 13, reflected by the video switching device 12, and transmitted through the beam splitter switching device 25 and the dichroic mirror switching device 24 in sequence to reach the edge filter switching device. After the scattered light is filtered by the edge filter switching device, the fluorescence signal is focused on the confocal hole 18 and irradiates on a grating in the grating switching and rotating device 21 for light splitting, and focused on the spectrum detection device 23 to form a fluorescence spectrum. The triaxial sample object stage 14 can carry the measured substance and drive the measured substance to move along a horizontal plane and a vertical plane. The objective lens 13 is arranged directly facing the triaxial sample object stage 14. The instrument body includes an instrument base plate 26, and a first shell 27 and a second shell 28 which are arranged on the instrument base plate 26. The first shell 27 and the second shell 28 are arranged side by side. The sum of base areas of the first shell 27 and the second shell 28 is smaller than top surface area of the instrument base plate 26. The first shell 27 includes a suspended structure 29. The laser 1, the laser filter 2, the nanoparticle film linear polarizer 6, the laser attenuation device 8, the edge filter switching device and the video switching device 12 are all arranged in an inner cavity of the first shell 27. The objective lens 13 is arranged at a bottom of the suspended structure 29 of the first shell 27. The triaxial sample object stage 14 is arranged on the instrument base plate 26 below the objective lens 13. The triaxial sample object stage 14 is located outside the first shell 27 and the second shell 28. The confocal hole 18 and the grating switching and rotating device 21 are arranged in an inner cavity of the second shell 28. The inner cavity of the second shell 28 is a sealed light shielding cavity. The spectrum detection device 23 is arranged on an outer wall of the second shell 28.

The microscopic confocal fluorescence spectrometer in the present disclosure includes the optical system and the instrument body. By adopting an open microscopic fluorescence light path, a lens body part of an existing spectrometer microscope is omitted, so that the space behind the objective lens 13 is significantly increased, and the adaptability of the instrument is improved. Moreover, by reasonably arranging the laser 1, the spectrum detection device 23 and other components, the space on the side of the objective lens 13 is further increased, and the occupied space of the optical system is reduced, so that the overall volume of the instrument is reduced, and the adaptability of the instrument is further improved. The optical system is mounted through the instrument base plate 26, the first shell 27 and the second shell 28, and strong support is provided for the components of the optical system, so that the working stability and reliability of the instrument are improved. In addition, the spectrum detection device 23 is arranged outside the second shell 28 to facilitate the heat dissipation of the spectrum detection device 23, so that the thermal stability and working reliability of the instrument are further improved. In addition, the optical system and the instrument body in the present disclosure are of a modular structure design, and can work in conjunction with other detection equipment or be adapted to other spectrometer systems in the market in practical applications, so that the universality of the instrument is improved. The triaxial sample object stage 14 is arranged on the instrument base plate 26 on one side of the first shell 27 and the second shell 28 to facilitate the placement of the measured substance, so that the operation convenience of the instrument is improved.

It should also be noted that a first reflector 3, a second filter 4 and a first filter 5 are arranged in sequence between the laser filter 2 and the nanoparticle film linear polarizing plate 6. A second reflector 7 is arranged between the nanoparticle film linear polarizer 6 and the laser attenuation device 8. A third reflector 9 and a fourth reflector 10 are arranged in sequence between the laser attenuation device 8 and the edge filter switching device. A sixth reflector 16 and a third lens 17 are arranged in sequence between the edge filter switching device and the confocal hole 18. A fourth lens 19 and a seventh reflector 20 are arranged in sequence between the confocal hole 18 and the grating switching and rotating device 21. A fifth lens 22 is arranged between the grating switching and rotating device 21 and the spectrum detection device 23. The video switching device 12 includes a fifth reflector. By arranging the reflectors, the light path is turned, and the light path length is significantly reduced, so that the overall size of the instrument is reduced. The first reflector 3, the first filter 5, the second filter 4, the second reflector 7, the third reflector 9, the fourth reflector 10 and the sixth reflector 16 are all arranged in the inner cavity of the first shell 27. The third lens 17, the fourth lens 19 and the seventh reflector 20 are all arranged in the inner cavity of the second shell 28. Here, it should also be noted that in practical applications, supports for mounting the reflectors and the lens can be arranged in the first shell 27 and the second shell 28, and stable mounting foundations are provided for the optical elements without influencing the propagation of the light path.

In this embodiment, a partition plate 31 is arranged in the inner cavity of the second shell 28. The fourth lens 19 and the fifth lens 22 are both arranged on the partition plate 31. The partition plate 31 provides a mounting foundation for the fourth lens 19 and the fifth lens 22, and also enhances the structural strength of the second shell 28, so that the stability of the instrument is further improved.

An optical mounting plate 30 is arranged in the inner cavity of the first shell 27. The laser 1, the laser filter 2, the nanoparticle film linear polarizer 6, the laser attenuation device 8, the edge filter switching device and the video switching device 12 are all arranged on the optical mounting plate 30. The optical mounting plate 30 provides stable supports for the optical elements, and ensures normal operations of the optical elements and a smooth propagation of the light path. The optical mounting plate 30 also provides convenience for the mounting, positioning and adjustment of the optical elements, so that the stress between the components is reduced, and the overall stability of the instrument is further improved.

Reinforcing plates 32 are connected with the suspended structure 29 of the first shell 27. The suspended structure 29 is connected with a side wall of the first shell 27 through the reinforcing plates 32. The reinforcing plates 32 are located at a bottom of the suspended structure 29, so that the effect of supporting a main body of the first shell 27 on the suspended structure 29 is enhanced, and the structural strength of the main body of the instrument is improved. The reinforcing plates 32 are each of a trapezoidal plate-shaped structure, and the occupied space of the reinforcing plates 32 is reduced while the support is stabilized, so that the triaxial sample object stage 14 can load a large measured substance, and the adaptability of the instrument is improved.

In this embodiment, the optical mounting plate 30 is located at a middle-upper part of the inner cavity of the first shell 27 to meet the requirements of optical path design. In practical applications, the mounting position of the optical mounting plate 30 relative to an inner wall of the first shell 27 can be adjusted, and an operator can adjust the position of the optical mounting plate 30 according to different test requirements, so that different working conditions are met, and the flexibility and adaptability of the instrument are improved. In addition, the number of the reinforcing plates 32 is two. The two reinforcing plates 32 are arranged on both sides of the suspended structure 29, so that the force uniformity of the suspended structure 29 is improved, the suspended structure 29 is stably supported, and the influence on the normal operation of the instrument is avoided.

It should also be emphasized that the spectrum detection device 23 is fixed to an outer side wall of the second shell 28 by a connecting piece 33. The connecting piece 33 is H-shaped. The spectrum detection device 23 is arranged on an outer wall of the second shell 28 by the connecting piece 33 to facilitate the heat dissipation of the spectrum detection device 23. The connecting piece 33 can be of a hollow structure. A heat dissipation base of the spectrum detection device 23 transmits heat to a side wall of the second shell 28 by the connecting piece 33, so that the heat dissipation efficiency of the spectrum detection device 23 is increased.

More specifically, the triaxial sample object stage 14 is detachably connected with the instrument base plate 26. When the measured substance is too large to be placed on the triaxial sample object stage 14, the triaxial sample object stage 14 can be detached from the instrument base plate 26, and the measured substance is directly placed on the instrument base plate 26 for testing, so that the adaptability of the instrument is further improved.

In other embodiments of the present disclosure, the grating switching and rotating device 21 includes a grating, a grating fixing part, a grating trimming element, a rotating element and a traverse module. The grating fixing part is configured to fix the grating. The grating trimming element is configured to adjust a pitching angle of the grating. The traverse module is configured to drive the grating fixing part to reciprocate along a direction perpendicular to light path. The rotating element is configured to drive the grating fixing part to rotate. The traverse module and the rotating element are each connected with a driver. The grating switching and rotating device 21 realizes the coaxial switching and coaxial rotation of the grating, so that the precision and stability requirements of the control system are significantly reduced, and the spectral stability of the instrument is improved.

In addition, the laser 1, the laser filter, the nanoparticle film linear polarizer 6, the laser attenuation device 8, the edge filter switching device and the video switching device 12 each have an adjusting mechanism to realize adjustment of pitching angles of the components and distances between the components.

In this embodiment, the laser 1 (CW LASER3) includes a rectangular laser module, a "-" shaped laser module fixing base, an integrated metal fixing base plate, three locking screws and three adjusting jackscrews. The rectangular laser module can be fixed on the integrated metal fixing base plate through the "-" shaped laser module fixing base, and the pitching angle and position of the laser in an up and down direction can be adjusted through the three locking screws and the three adjusting jackscrews.

The laser filter 2 (LINEFILTER3) includes a hollow fixing vertical plate and a circular laser filter fixing part. The hollow fixing vertical plate and the circular laser filter fixing part can realize precise fixation of the laser filter 2.

The first reflector 3 (M1) includes a reflector, a rectangular fixing vertical plate and a concave reflector fixing part. Precise fixation of the reflector can be realized by the rectangular fixing vertical plate and the concave reflector fixing part, and the pitching and position of the reflector in a front and back direction can be adjusted through the three screws and the three jackscrews on the rectangular fixing vertical plate.

The second filter 4 (LPD2) includes a hollow semicircular fixing vertical plate and a semicircular filter fixing part. Precise fixation of the second filter 4 can be realized by the semicircular fixing vertical plate and the semicircular filter fixing part, and the pitching and position of the filter in the front and back direction can be adjusted through the three screws and the three jackscrews on the semicircular fixing vertical plate.

The first filter 5 (LPD1) includes a hollow semicircular fixing vertical plate and a semicircular filter fixing part. Precise fixation of the first filter 5 can be realized by the semicircular fixing vertical plate and the semicircular filter fixing part, and the pitching and position of the filter in the front and back direction can be adjusted through the three screws and the three jackscrews on the semicircular fixing vertical plate.

The nanoparticle film linear polarizer 6 (NFLP) includes a circular nanoparticle film linear polarizer 6, a square nanoparticle film linear polarizer fixing side plate, an annular nanoparticle film linear polarizer fixing part, and a "-" shaped vertical plate. Precise fixation of the nanoparticle film linear polarizer 6 can be realized by the annular nanoparticle film linear polarizer fixing part and the square nanoparticle film linear polarizer fixing side plate. The nanoparticle film linear polarizer fixing side plate can be fixed on the optical mounting plate 30 through the "-" shaped vertical plate. The position of the nanoparticle film linear polarizer 6 in the main light path of the instrument can be adjusted by adjusting position of the "-" shaped vertical plate in a left and right direction.

The second reflector 7 (M2) includes a rectangular fixing vertical plate and a concave reflector fixing part. Precise fixation of the reflector can be realized by the rectangular fixing vertical plate and the concave reflector fixing part, and the pitching and position of the reflector in the front and back direction can be adjusted by the three screws and the three jackscrews on the rectangular fixing vertical plate.

The laser attenuation device 8 (DENSITYFILTER) includes a circular attenuation plate, an annular attenuation plate fixing part, a T-shaped motor fixing part and a motor. Precise fixation of the circular attenuation plate can be realized by the annular attenuation plate fixing part, fixation of the motor can be realized by the T-shaped motor fixing part, and the angle of the attenuation plate is adjusted by the rotation of a stepping motor to realize attenuation of laser.

The third reflector 9 (M3) includes a rectangular fixing vertical plate and a concave reflector fixing part. Precise fixation of the reflector can be realized by the rectangular fixing vertical plate and the concave reflector fixing part, and the pitching and position of the reflector in the front and back direction can be adjusted by the three screws and the three jackscrews on the rectangular fixing vertical plate.

The fourth reflector 10 (M4) includes a rectangular fixing vertical plate and a concave reflector fixing part. Precise fixation of the reflector can be realized by the rectangular fixing vertical plate and the concave reflector fixing part, and the pitching and position of the reflector in the front and back direction can be adjusted by the three screws and the three jackscrews on the rectangular fixing vertical plate.

The edge filter group of the edge filter switching device includes a fifth filter 11 and a sixth filter 15. The fifth filter (LPF5) includes an edge filter, an annular pressing part, a rectangular hollow filter fixing part and a rectangular hollow vertical plate. Precise fixation of the edge filter can be realized by the annular pressing part and the rectangular hollow filter fixing part, and the pitching and position of the edge filter in the front and back direction can be realized by the three screws and the three jackscrews on the rectangular hollow vertical plate. The sixth filter 15 (LPD6) includes a hollow semicircular fixing vertical plate and a semicircular filter fixing part. Precise fixation of the sixth filter 15 can be realized by the semicircular fixing vertical plate and the semicircular filter fixing part, and the pitching and position of the filter in the front and back direction can be realized by the three screws and the three jackscrews on the semicircular fixing vertical plate.

The video switching device 12 (FPART4) includes a circular reflector, a concave reflector fixing part, a square reflector vertical plate, a square beam splitter, a square beam splitter fixing part, a square beam splitter vertical plate, an L-shaped hollow fixing part, a sliding device, a sliding device fixing part, a gear, a motor fixing part and a motor. Precise fixation of the circular reflector can be realized by the concave reflector fixing part, and the pitching and position of the circular reflector in the front and back direction can be realized by the square reflector vertical plate, the three screws and the three jackscrews. Precise fixation of the square beam splitter can be realized by the square beam splitter fixing part, and the pitching and position of the square beam splitter in the front and back direction can be adjusted by the square beam splitter vertical plate, the three screws and the three jackscrews. Fixation of the L-shaped hollow fixing part and the sliding device can be realized by the sliding device fixing part, fixation of the motor can be realized by the motor fixing part, and the positions of the circular reflector and the square beam splitter are changed by rotating the gear on the stepping motor.

The objective lens 13 (OBJ1) includes an objective lens 13, an objective lens turntable, a hollow cylindrical light shielding tube, a hollow inverted T-shaped objective lens turntable fixing part and an adjustable module. Precise fixation of the objective lens 13 can be realized by the objective lens turntable, the connection between the objective lens 13 and the inverted T-shaped objective lens turntable fixing part and the shielding of external ambient light can be realized by the hollow cylindrical light shielding tube, and the focal length of the objective lens 13 can be adjusted by the adjustable module.

The triaxial sample object stage 14 includes an integrated fixing base, an X-axis moving module, an X-axis voice coil motor, a Y-axis moving module, a Y-axis voice coil motor, a Z-axis moving module, a Z-axis voice coil motor, and an object stage. Precise fixation of the X-axis moving module, Y-axis moving module and Z-axis moving module can be realized by the integrated fixing base, and high-precision movement of the object stage in X, Y and Z directions can be realized by the X-axis voice coil motor, Y-axis voice coil motor and Z-axis voice coil motor.

The sixth reflector 16 (M6) includes a rectangular fixing vertical plate and a concave reflector fixing part. Precise fixation of the reflector can be realized by the rectangular fixing vertical plate and the concave reflector fixing part, and the pitching and position of the reflector in the front and back direction can be adjusted by the three screws and the three jackscrews on the rectangular fixing vertical plate.

The third lens 17 (LENSE3) includes a hollow fixing vertical plate and a hollow cylindrical lens fixing part. The lens can be fixed concentrically in the main light path by the hollow cylindrical lens fixing part. The hollow cylindrical lens fixing part can be fixed by the upper and lower fixing screws of the hollow fixing vertical plate, and the position of the cylindrical lens fixing part in the main light path can be adjusted up and down or left and right.

The confocal hole 18 (HOLE) is based on a concave confocal device base with adjustable pitching angle and position in the up and down direction. A confocal hole device vertical plate is fixed above the confocal device base. A longitudinal sliding block base is fixed at the position of a right edge of the confocal hole device vertical plate. A longitudinal sliding block module that can move in the up and down direction is connected directly above the longitudinal sliding block base. A confocal hole baffle plate module is fixed on a right side of the longitudinal sliding block module. A pushing plate fixed on a pushing plate connecting module is transversely pushed by the stepping motor. The movement range of the pushing plate is limited between a left limiter and a right limiter. When the pushing plate is transversely pushed by the stepping motor, columnar limiter modules moves in the up and down direction, so that the distance between the confocal hole baffle plate modules can be changed to realize the adjustment of the size of the confocal hole 18.

The fourth lens 19 (LENSE4) includes a hollow fixing vertical plate and a hollow cylindrical lens fixing part. The lens can be fixed concentrically in the main light path by the hollow cylindrical lens fixing part. The hollow cylindrical lens fixing part can be fixed by the upper and lower fixing screws on the hollow fixing vertical plate, and the position of the cylindrical lens fixing part in the main light path can be adjusted in the up and down direction or left and right direction.

The seventh reflector 20 (M7) includes a triangular fixing plate and a concave reflector fixing part. Precise fixation of the reflector can be realized by the triangular fixing plate and the concave reflector fixing part, and the pitching and position of the reflector in the front and back direction can be adjusted by the three screws and the three jackscrews on the rectangular fixing vertical plate.

The grating switching and rotating device 21 (FPART5) includes a grating rotating fixing part, a rotating motor, a grating, a grating fixing part, a grating locking fixing part, a stepping motor, a gear, a transverse moving module and a grating trimming element. Precise fixation of the grating can be realized by the grating fixing part and the grating locking fixing part. Trimming of the grating pitching and angle can be realized by the grating trimming element. Movement of the grating in the left and right direction can be realized by the stepping motor, the gear and the transverse moving module. Rotation of the grating can be realized by the grating rotating fixing part and the rotating motor.

The fifth lens 22 (LENSE5) includes a hollow fixing vertical plate and a hollow cylindrical lens fixing part. The lens can be fixed concentrically in the main light path by the hollow cylindrical lens fixing part. The hollow cylindrical lens fixing part can be fixed by the upper and lower fixing screws on the hollow fixing vertical plate, and the position of the cylindrical lens fixing part in the main light path can be adjusted in the up and down direction or left and right direction.

The spectrum detection device 23 (DETECTER) includes a hollow H-shaped connecting piece 33, a convex heat dissipation base, a detector fixing part, a hollow square fixing part and a CCD (Charge-Coupled Device) module. The CCD module can be precisely fixed at the center of the light path by the detector fixing part and the hollow square fixing part. The heat produced by the CCD module can be quickly dissipated through the convex heat dissipation base. The convex heat dissipation base can be precisely fixed with the instrument side plate through the hollow H-shaped connecting piece 33. The heat produced by the convex heat dissipation base can be guided to the entire side plate of the instrument through the hollow H-shaped connecting piece 33 so as to increase the heat dissipation efficiency.

In other embodiments of the present disclosure, the components can also adopt adjusting mechanisms of other structures to realize the adjustment of the components and meet different testing requirements. In addition, in practical applications, a small limit switch can be used to replace a photoelectric switch to significantly reduce the volume of the video switching device 12, the grating switching and rotating device 21 and the confocal hole 18, and thus the volume of the instrument is reduced.

In practical applications, the first shell 27 can be of a split structure to facilitate the installation, adjustment, and daily maintenance of various components, so that the operation convenience of the instrument is improved.

In order to further ensure the structural stability of the instrument, legs 34 are arranged at a bottom of the instrument base plate 26, and the legs 34 are adjustable in height. After the components are installed, the legs 34 can be used for adjusting the overall levelness and height of the instrument to ensure the normal operation of the instrument and further improve the adaptability of the instrument.

According to the microscopic confocal fluorescence spectrometer in the present disclosure, the light path can be turned by using the reflectors, so that the light path is significantly reduced. Moreover, the laser 1 can share the light paths of the second filter 4 and the first filter 5, so that the overall size of the instrument is reduced, and the applicability of the instrument is improved. In addition, the confocal hole 18, the grating switching and rotating device 21, the video switching device 12 and the nanoparticle film linear polarizer 6 in the present disclosure all are of a modular structure design, can be adapted to most spectrometer systems in the market, and can work in conjunction with other detection equipment in practical applications, so that the universality of the instrument is improved.

Specific examples are used for illustration of the principles and implementations of the present disclosure. The description of the above-mentioned embodiments is used to help illustrate the method and its core principles of the present disclosure. In addition, those skilled in the art can make various modifications to the specific embodiments and scope of application in accordance with the teachings of the present disclosure. In summary, the contents of this description should not be understood as the limitation of the present disclosure.

What is claimed is:

1. A microscopic confocal fluorescence spectrometer, comprising:
   an optical system, the optical system comprises a laser, a laser filter, a nanoparticle film linear polarizer, a laser attenuation device, an edge filter switching device, a dichroic mirror switching device, a beam splitter switching device, a video switching device, a confocal hole, a grating switching and rotating device, a spectrum detection device, a triaxial sample object stage and an objective lens; a light beam emitted by the laser is filtered by the laser filter and reflected, the reflected light beam is incident into the nanoparticle film linear polarizer, a light beam emitted from the nanoparticle film linear polarizer is attenuated by the laser attenuation device, the attenuated light beam is incident into an edge filter group of the edge filter switching device, the light beam reflected by the edge filter switching device passes through the dichroic mirror switching device, the beam splitter switching device and the video switching device in sequence, the light beam reflected by the video switching device irradiates on a measured substance through the objective lens, a fluorescence signal and scattered light produced by the measured substance after excitation are collected by the objective lens, reflected by the video switching device, and transmitted through the beam splitter switching device and the dichroic mirror switching device in sequence to reach the edge filter switching device; the scattered light is filtered by the edge filter switching device, the fluorescence signal is focused on the confocal hole and irradiates on a grating in the grating switching and rotating device for light splitting, and focused on to the spectrum detection device to form a fluorescence spectrum; the triaxial sample object stage is capable of carrying the measured substance and driving the measured substance to move along a horizontal plane and a vertical plane, and the objective lens is arranged directly facing the triaxial sample object stage;
   an instrument body, the instrument body comprises an instrument base plate, and a first shell and a second shell which are arranged on the instrument base plate; the first shell and the second shell are arranged side by side, sum of base areas of the first shell and the second shell is smaller than top surface area of the instrument base plate, and the first shell comprises a suspended structure; the laser, the laser filter, the nanoparticle film linear polarizer, the laser attenuation device, the edge filter switching device and the video switching device are all arranged in an inner cavity of the first shell, the objective lens is arranged at a bottom of the suspended structure of the first shell, and the triaxial sample object stage is arranged on the instrument base plate below the objective lens; the confocal hole and the grating switching and rotating device are arranged in an inner cavity of the second shell, the inner cavity of the second shell is a sealed light shielding cavity, and the spectrum detection device is arranged on an outer wall of the second shell.

2. The microscopic confocal fluorescence spectrometer according to claim 1, wherein a first reflector, a second filter and a first filter are arranged in sequence between the laser filter and the nanoparticle film linear polarizing plate, a second reflector is arranged between the nanoparticle film linear polarizer and the laser attenuation device, a third reflector and a fourth reflector are arranged in sequence between the laser attenuation device and the edge filter switching device, a sixth reflector and a third lens are arranged in sequence between the edge filter switching device and the confocal hole, a fourth lens and a seventh reflector are arranged in sequence between the confocal hole and the grating switching and rotating device, a fifth lens is arranged between the grating switching and rotating device and the spectrum detection device, the video switching device comprises a fifth reflector, the first reflector, the first filter, the second filter, the second reflector, the third reflector, the fourth reflector and the sixth reflector are all arranged in the inner cavity of the first shell, and the third lens, the fourth lens and the seventh reflector are all arranged in the inner cavity of the second shell.

3. The microscopic confocal fluorescence spectrometer according to claim 2, wherein a partition plate is arranged in the inner cavity of the second shell, and the fourth lens and the fifth lens are both arranged on the partition plate.

4. The microscopic confocal fluorescence spectrometer according to claim 3, wherein the first shell is of a split structure;
legs are arranged at a bottom of the instrument base plate, and the legs are adjustable in height.

5. The microscopic confocal fluorescence spectrometer according to claim 2, wherein the first shell is of a split structure;
legs are arranged at a bottom of the instrument base plate, and the legs are adjustable in height.

6. The microscopic confocal fluorescence spectrometer according to claim 1, wherein an optical mounting plate is arranged in the inner cavity of the first shell, and the laser, the laser filter, the nanoparticle film linear polarizer, the laser attenuation device, the edge filter switching device and the video switching device are all arranged on the optical mounting plate;
reinforcing plates are connected with the suspended structure of the first shell, the suspended structure is connected with a side wall of the first shell through the reinforcing plates, and the reinforcing plates are each of a trapezoidal plate-shaped structure.

7. The microscopic confocal fluorescence spectrometer according to claim 6, wherein the optical mounting plate is located at a middle-upper part of the inner cavity of the first shell; number of the reinforcing plates is two, and the two reinforcing plates are arranged on both sides of the suspended structure.

8. The microscopic confocal fluorescence spectrometer according to claim 7, wherein the first shell is of a split structure;
legs are arranged at a bottom of the instrument base plate, and the legs are adjustable in height.

9. The microscopic confocal fluorescence spectrometer according to claim 6, wherein the spectrum detection device is fixed on an outer side wall of the second shell by a connecting piece, and the connecting piece is H-shaped.

10. The microscopic confocal fluorescence spectrometer according to claim 9, wherein the first shell is of a split structure;
legs are arranged at a bottom of the instrument base plate, and the legs are adjustable in height.

11. The microscopic confocal fluorescence spectrometer according to claim 6, wherein the first shell is of a split structure;
legs are arranged at a bottom of the instrument base plate, and the legs are adjustable in height.

12. The microscopic confocal fluorescence spectrometer according to claim 1, wherein the triaxial sample object stage is detachably connected with the instrument base plate.

13. The microscopic confocal fluorescence spectrometer according to claim 12, wherein the first shell is of a split structure;
legs are arranged at a bottom of the instrument base plate, and the legs are adjustable in height.

14. The microscopic confocal fluorescence spectrometer according to claim 1, wherein the grating switching and rotating device comprises the grating, a grating fixing part, a grating trimming element, a rotating element and a traverse module, the grating fixing part is configured to fix the grating, the grating trimming element is configured to adjust a pitching angle of the grating, the traverse module is configured to drive the grating fixing part to reciprocate along a direction perpendicular to light path, the rotating element is configured to drive the grating fixing part to rotate, and the traverse module and the rotating element are each connected with a drivers.

15. The microscopic confocal fluorescence spectrometer according to claim 14, wherein the first shell is of a split structure;
legs are arranged at a bottom of the instrument base plate, and the legs are adjustable in height.

16. The microscopic confocal fluorescence spectrometer according to claim 1, wherein the laser, the laser filter, the nanoparticle film linear polarizer, the laser attenuation device, the edge filter switching device and the video switching device each have an adjusting mechanism to realize adjustment of pitching angles of components and distances between the components.

17. The microscopic confocal fluorescence spectrometer according to claim 16, wherein the first shell is of a split structure;
legs are arranged at a bottom of the instrument base plate, and the legs are adjustable in height.

18. The microscopic confocal fluorescence spectrometer according to claim 1, wherein the first shell is of a split structure;
legs are arranged at a bottom of the instrument base plate, and the legs are adjustable in height.

* * * * *